(12) United States Patent
Su

(10) Patent No.: US 6,796,620 B1
(45) Date of Patent: Sep. 28, 2004

(54) RAIL CAR SUPPLEMENTARY BRAKE AND ENERGY RECLAMATION AND POWER GENERATING SYSTEM

(76) Inventor: Yi-Tseng Su, No. 15-1, Alley 52, Lane 118, Ho-Ping East Road Sec. 2, Taipei (TW)

( * ) Notice: Subject to any disclaimer, the term of this patent is extended or adjusted under 35 U.S.C. 154(b) by 0 days.

(21) Appl. No.: 10/609,876

(22) Filed: Jun. 30, 2003

(51) Int. Cl.$^7$ ................................................. B60T 8/64
(52) U.S. Cl. ........................... 303/152; 188/63; 104/249
(58) Field of Search ................................. 303/151, 152; 188/62, 63; 104/256; 246/32

(56) References Cited

U.S. PATENT DOCUMENTS

| | | | | |
|---|---|---|---|---|
| 683,370 A | * | 9/1901 | Acklin | 104/249 |
| 683,371 A | * | 9/1901 | Acklin | 104/249 |
| 690,814 A | * | 1/1902 | Acklin | 104/249 |
| 1,442,667 A | * | 1/1923 | Ignle et al. | 188/63 |
| 1,508,998 A | * | 9/1924 | Simpson et al. | 188/63 |
| 1,594,211 A | * | 7/1926 | Nohse | 188/63 |
| 2,310,039 A | * | 2/1943 | Schmidt et al. | 246/32 |
| 2,435,471 A | * | 2/1948 | Schmidt | 188/62 |
| 3,115,215 A | * | 12/1963 | Anderson | 188/63 |
| 3,163,380 A | * | 12/1964 | Brodie | 188/62 |
| 4,588,932 A | * | 5/1986 | Riondel | 303/151 |
| 4,610,207 A | * | 9/1986 | Uttscheid | 104/256 |
| 2004/0035243 A1 | * | 2/2004 | Duval | 74/589 |

* cited by examiner

*Primary Examiner*—Robert A. Siconolfi
(74) *Attorney, Agent, or Firm*—Law Offices of David Pai; Chao-Chang David Pai

(57) ABSTRACT

A rail car supplementary brake and energy reclamation and power generating system is disclosed to include a motion unit, the motion unit having a pulley block connectable to the rail car and movable along a track in the rail of the rail car, an energy accumulator unit formed of a spiral power spring mechanism and a pull rope and connected to the pulley block and adapted to reserve elastic energy when the pulley block is pulled by the rail car, a power generator, and a transmission mechanism coupling the pull rope and the spiral power spring mechanism to the power generator for driving the power generator to generate electricity when the pull rope is pulling the spiral power spring to reserve elastic energy as well as when the spiral power spring is the reserved elastic energy.

5 Claims, 5 Drawing Sheets

US 6,796,620 B1

RAIL CAR SUPPLEMENTARY BRAKE AND ENERGY RECLAMATION AND POWER GENERATING SYSTEM

BACKGROUND OF THE INVENTION

1. Field of the Invention

The present invention relates generally to a rail car and, more specifically, to a rail car supplementary brake and energy reclamation and power generating system.

2. Description of the Related Art

In a rail car, for example, a train or trolley car, the braking action is achieved by stopping the rotary motion of the wheels to change the minor dynamic friction between the wheels and the rail to a greater static friction. The static friction consumes much kinetic energy of the rail car, causing the rail car to stop slowly. This friction force actuated braking action is commonly used in most transportation vehicles on the land. However, because a rail car, for example, a train or trolley car, is much heavier than an automobile or any of a variety of small transportation vehicles, the inertia force of a rail car is relatively greater. Therefore, it is difficult to stop a rail car within a short distance and time by means of friction. Further, when stopping a rail car, it is necessary to consume the kinetic energy of the rail car by converting it into heat energy or sound energy. Therefore, braking a rail car consumes much energy.

BRIEF SUMMARY OF THE INVENTION

The main object of the present invention is to provide a rail car supplementary brake and energy reclamation and power generating system to enhance the braking action of the rail car and to reclaim the energy consumed during each braking action of the rail car for generating electricity.

To achieve this object of the present invention, the rail car supplementary brake and energy reclamation and power generating system comprises a motion unit, the motion unit comprising a track longitudinally arranged in the middle of a rail for rail car, a pulley block mounted on and movable along the track, and coupling means provided for a rail car moving on the rail for rail car and controlled to couple the pulley block to the rail car; an energy accumulator unit, the energy accumulator unit comprising a spiral power spring mechanism, and a pull rope connected between the spiral power spring mechanism and the pulley block, the pull rope driving the spiral spring mechanism to wind up and to reserve elastic energy when the pulley block is pulled by the rail car along the track away from the spiral power spring mechanism, the spiral spring mechanism being released to discharge elastic energy when the pulley block receives no pull force; and a power generator unit, the power generator unit comprising a power generator, and a transmission mechanism coupling the pull rope and the spiral power spring mechanism to the power generator for driving the power generator to generate electricity both when the spiral power spring mechanism is reserving elastic energy and when it is releasing elastic energy.

DETAILED DESCRIPTION OF THE PREFERRED EMBODIMENT

Figure 1:
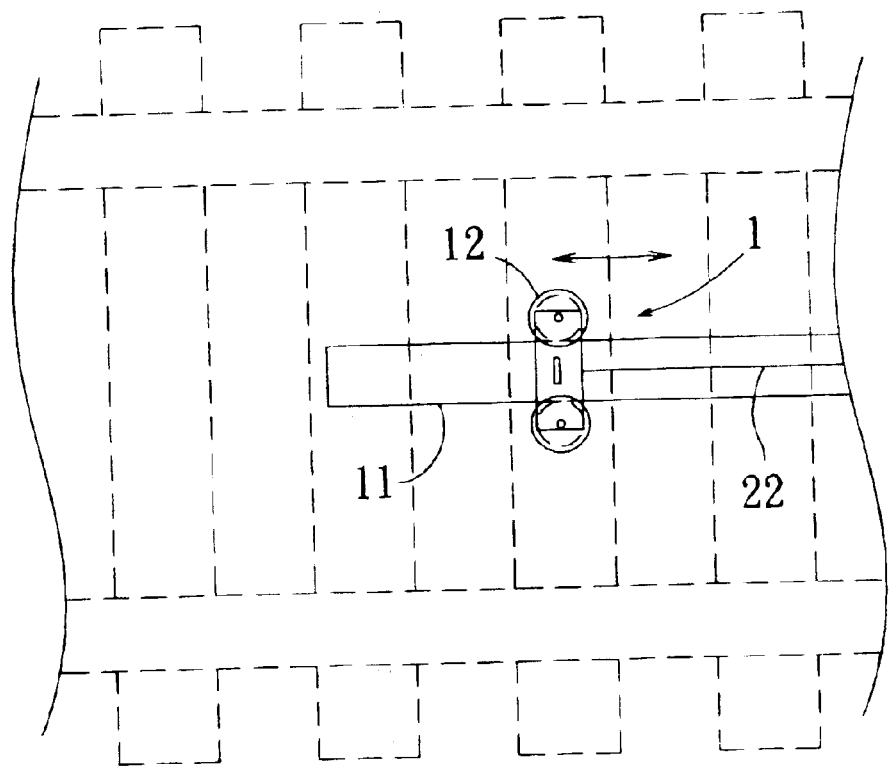
FIG. 1 is a top plain view of the motion unit for the rail car supplementary brake and energy reclamation and power generating system according to the present invention.
Figure 2:
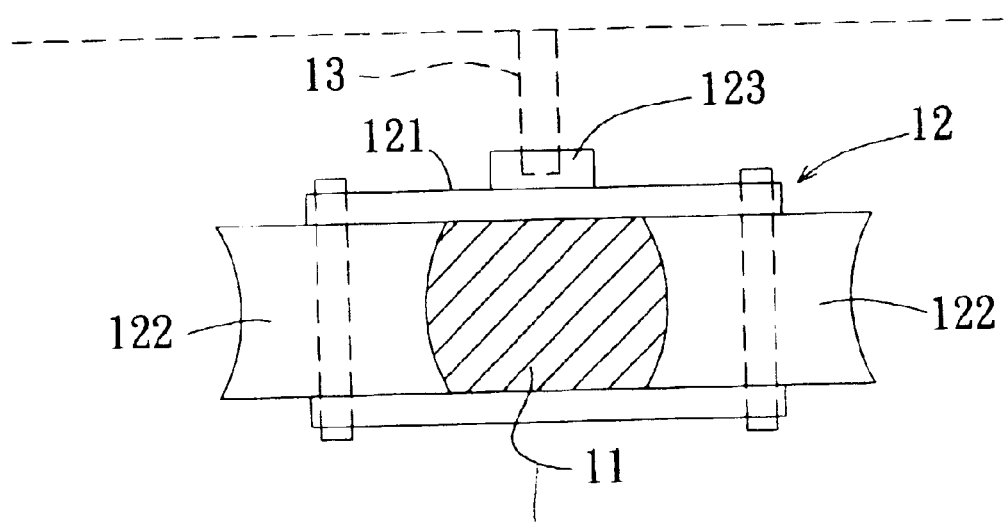
FIG. 2 is a side view of FIG. 1.
Figure 3:
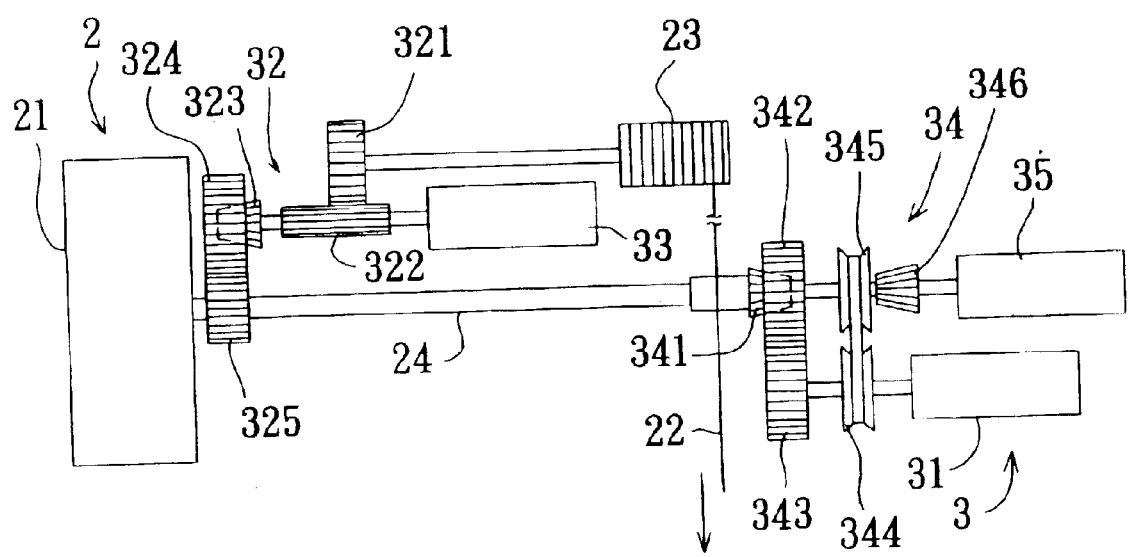
FIG. 3 is schematic structural view of the energy accumulator unit and power generator unit for the rail car supplementary brake and energy reclamation and power generating system according to the present invention.

Referring to FIGS. 1–3, a rail car supplementary brake and energy reclamation and power generating system in accordance with the present invention generally comprises a motion unit 1, an energy accumulator unit 2, and a power generator unit 3.

The motion unit 1 comprises a track 11 longitudinally arranged in the middle of the rail for rail car, and a pulley block 12 mounted on the track 11 (see FIG. 1). As illustrated in FIG. 2, the pulley block 12 comprises a base frame 121 bridging the track 11, and two pulleys 122 fastened pivotally with the base frame 121 and respectively peripherally disposed in contact with the track 11 at two sides. The pulleys 122 are preferably made of rubber or covered with rubber so that sufficient friction is produced between the pulleys 122 and the track 11 to allow the pulley block 12 to be moved stably along the track 11. The base frame 121 of the pulley block 12 has a retainer plate 123 coupled to a coupler (for example, a hook) 13 provided for the rail car (not shown). Therefore, the rail car carries the pulley block 12 along the track 11 when moved.

Figure 3A:
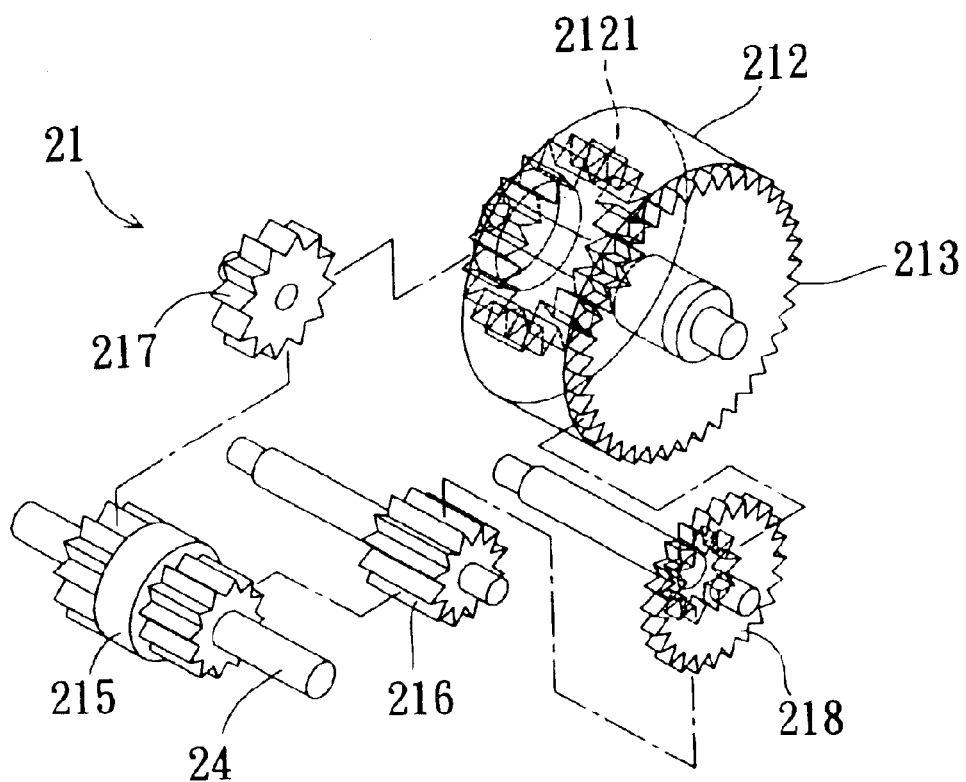
FIG. 3A is a perspective exploded view of the spiral power spring mechanism for the rail car supplementary brake and energy reclamation and power generating system according to the present invention.
Figure 3B:
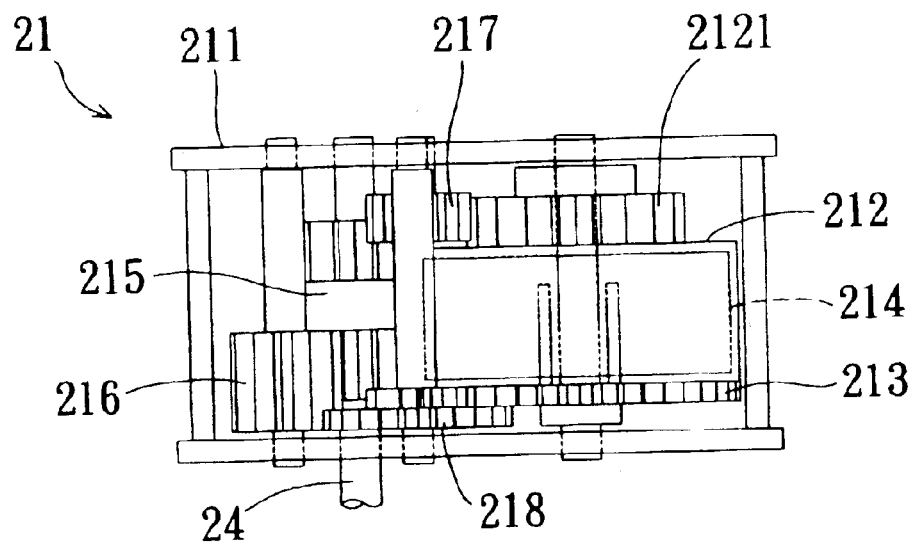
FIG. 3B is a top view of the spiral power spring mechanism for the rail car supplementary brake and energy reclamation and power generating system according to the present invention.
Figure 3C:
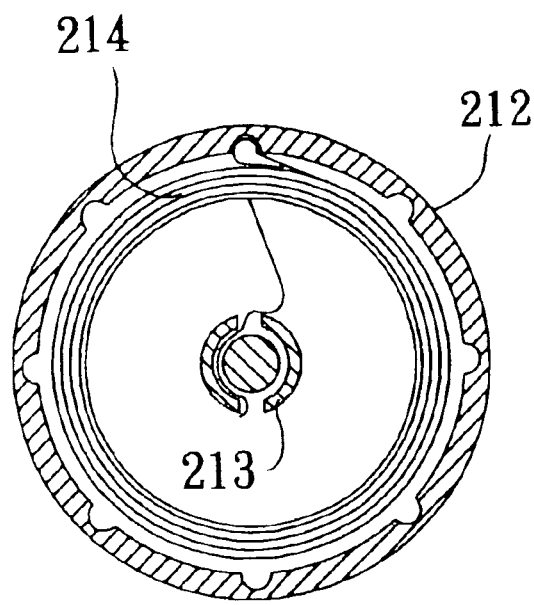
FIG. 3C is a sectional view on an enlarged scale of a part of FIG. 3A.

Referring to FIGS. 3A, 3B and 3C, the energy accumulator unit 2 comprises a spiral power spring mechanism 21 and a pull rope 22 connected to the pulley block 12. The spiral power spring mechanism 21 comprises a bracket 211, a cylindrical shell 212 pivotally mounted in the bracket 211, a gear 213 coaxially provided at one side of the cylindrical shell 212, a spiral power spring 214 mounted inside the cylindrical shell 212 having its two ends respectively fixedly fastened to the inside wall of the cylindrical shell 212 and the shaft of the gear 213, a gear 2121 integrated with the cylindrical shell 212 on the side opposite to the gear 213, a main transmission shaft 24 pivotally mounted in the bracket 211, a shaft gear 215 integrated with the main transmission shaft 24, a first transmission gear 216 meshed with the shaft gear 215, a gear 218 meshed between the gear 213 and the first transmission gear 216, and a second transmission gear 217 meshed between the shaft gear 215 and the gear 2121.

When the main transmission shaft 24 is rotated, the shaft gear 215 rotates the first transmission gear 216 and the second transmission gear 217, therefore a part of the rotary driving power of the main transmission shaft 24 is transferred to the gear 213 through the first transmission gear 216 and the gear 218, and the other part of the rotary driving power of the main transmission shaft 24 is transferred to the cylindrical shell 212 through the second transmission gear 217 and the gear 2121, causing the cylindrical shell 212 and the gear 213 to rotate in reverse directions to wind up the spiral power spring 214. On the contrary, when the spiral power spring 214 is released, elastic energy of the spiral power spring 214 drives the main transmission shaft 24 to rotate in the reverse direction.

Furthermore, the pull rope 22 is wound round a rope drum 23. When the pulley block 12 is moved to pull the pull rope 22 away from the spiral power spring mechanism 21, the main transmission shaft 24 is rotated in a direction to wind up the spiral power spring 214. When the pull rope 22 receives no pull force from the pulley block 12, the spiral power spring 214 releases the reserved elastic energy to rotate the main transmission shaft 24 in the reverse direction.

Figure 4:
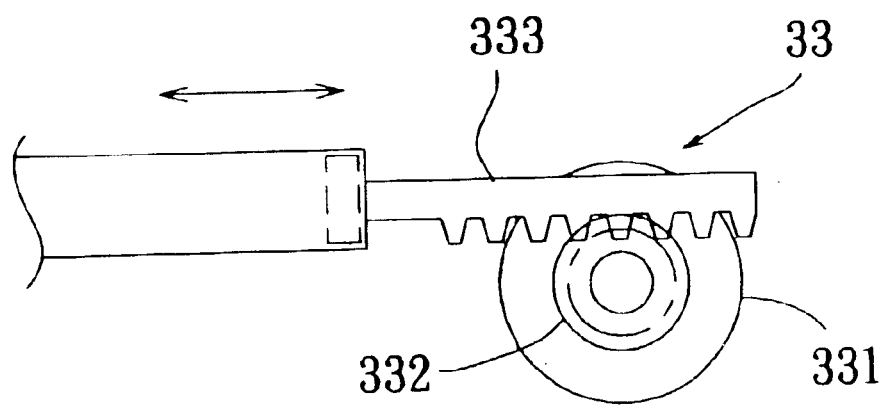
FIG. 4 is a schematic drawing showing the structure of the first clutch for the rail car supplementary brake and energy reclamation and power generating system according to the present invention.

The power generator unit 3 comprises a power generator 31 and a transmission mechanism coupling the pull rope 22 and the spiral power spring mechanism 21 to the power generator 31. The transmission mechanism comprises a first transmission gear set 32 formed of a series of gears 321, 322, 323, 324 and 325 (the gear 321 is synchronous to the rope drum 23; the gear 325 is synchronous to the main transmission shaft 24; the gears 323 and 324 are axially detachably coupled together), and a first clutch 33 adapted to control the engagement/disengagement between the gears 323 and 324. The first clutch 33, as shown in FIG. 4, comprises a mini motor 331, a pinion 332 fixedly mounted on the output shaft of the mini motor 331, and a rack 333 connected to the gear 323 and meshed with the pinion 332. By rotating the mini motor 331 clockwise or counter-clockwise, the rack 333 is reciprocated to move the gear 323 to engage with or disengage from the gear 324. The transmission mechanism of the power generator unit 3 further comprises a second transmission gear set 34, and a second clutch 35. The second transmission gear set 24 is comprised of a series of gears 341, 342 and 343, belt pulleys 344 and 345, and a gear 346. The gears 341 and 346 are synchronous to the main transmission shaft 24. The gear 343 and the belt pulley 344 are synchronous to the shaft of the power generator 31. The gear 342 and the belt pulley 345 are not rotated by the main transmission shaft 24, but respectively detachably connected to the gears 341 and 346. The second clutch 35 controls the engagement/disengagement between the gear 341 and the gear 342 and between the gear 346 and the belt pulley 345. According to this embodiment, the second clutch 35 has the same structure as the first clutch 33. The second transmission gear set 34 and the second clutch 35 couple the spiral power spring mechanism 21 to the power generator 31.

Referring to FIG. 3 again, the motion unit 1 is installed in the rail near the railway station or a specific speed-reduction section. When the rail car driver brakes the car approaching the railway station or the specific speed-reduction section, the control sensor (not shown) drives the rail car to lower the coupler 13 and to force the coupler 13 into engagement with the retainer plate 123, for enabling the pulley block 12 to be carried by the rail car along the track 11, and therefore the pull rope 22 is pulled outwards to rotate the rope drum 23.

The initial position of the first clutch 33 keeps the gears 323 and 324 meshed. The initial position of the second clutch 35 keeps the gears 341 and 342 meshed, however the gear 346 and the belt pulley 345 are disengaged at this time. When the pull rope 22 is pulled to rotate the rope drum 23, the rotary driving power is transferred through the gears 321, 322, 323, 324 and 325 to the main transmission shaft 24, thereby causing the main transmission shaft 24 to wind up the spiral power spring 214 of the spiral power spring mechanism 21. At the same time, the main transmission shaft 24 rotates the gears 341 and 342 to further drive the power generator 31 to generate electricity. Thus, the pulley block 12 and the pull rope 22 impart a resisting force to the coupler 13, thereby enhancing the braking action of the rail car. On the contrary, the kinetic energy of the pulley block 12 directly drives the power generator 31 to generate electricity.

Figure 5:
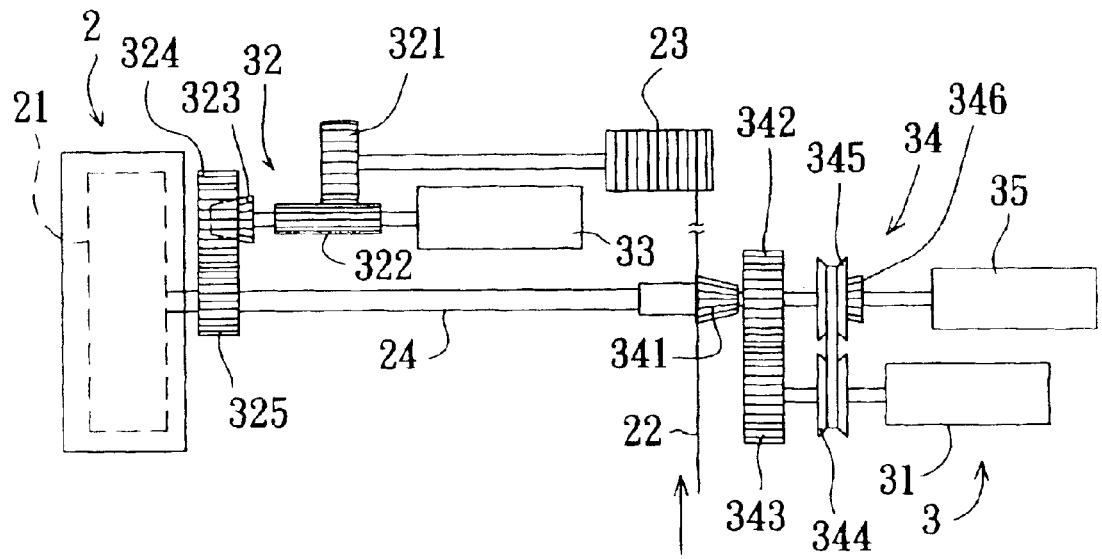
FIG. 5 is similar to FIG. 3 but showing the status of the second clutch upon winding of the pull rope on the rope drum.

Referring to FIG. 5, when the pull rope 22 is pulled out of the rope drum 23 to a predetermined distance, the coupler 13 of the rail car is automatically disconnected from the pulley block 12. At that time, the pull rope 22 receives no pull force, and the spiral power spring 214 starts to release the reserved elastic energy, thereby causing the main transmission shaft 24 to be rotated reversely. At the moment when the coupler 13 is disconnected from the pulley block 12, a control sensor (not shown) is induced to drive the second clutch 35, causing the gear 346 to be engaged with the belt pulley 345, and the gear 341 to be disengaged from the gear 342. Therefore, reverse rotation of the main transmission shaft 24 causes the gear 346 and the belt pulleys 344 and 345 to rotate the shaft of the power generator 31 in the same direction, driving the power generator 31 to generate electricity continuously.

Figure 6:
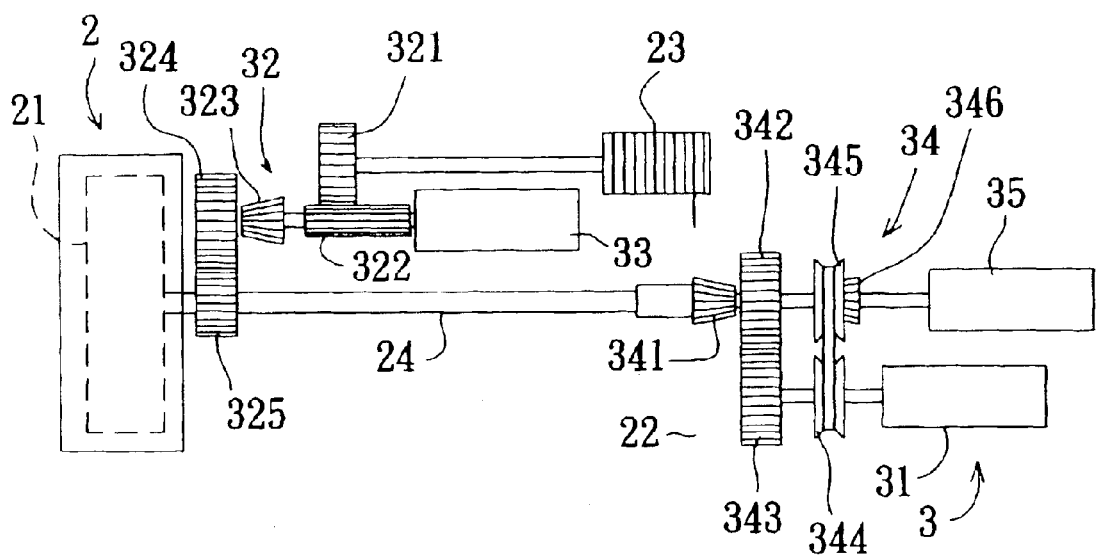
FIG. 6 is similar to FIG. 3 but showing the status of the second clutch upon stoppage of the winding of the pull rope on the rope drum.

On the other hand, reverse rotation of the main transmission shaft 24 drives the gears 325, 324, 323, 322 and 321 to rotate the rope drum 23, causing the rope drum 23 to roll up the pull rope 22. Because the number of turns of the main transmission shaft 24 caused by the elastic energy of the spiral power spring 214 is greater than the number of turns of the rope drum 23 to roll up the pull rope 22, the stopped rope drum 23 may offset the rotary driving force of the main transmission shaft 24. This problem is eliminated by the action of the first clutch 33. As shown in FIG. 6, the first clutch 33 is controlled by a sensor (not shown) to disengage the gear 323 from the gear 324, preventing the rotary driving force from the main transmission shaft 24 from being offset by the rope drum 23, and therefore the rotary driving power of the main transmission shaft 24 is fully transmitted to the power generator 31 for generating electricity, i.e., the elastic energy of the spiral power spring 214 is fully utilized. After the elastic energy of the spiral power spring 214 has been completely released, the first clutch 33 and the second clutch 35 return to their initial positions for a next operation cycle to be repeated upon passing of a next rail car.

While only one embodiment of the invention has been described in detail for purposes of illustration, it is understood that various modifications and enhancements can be made without departing from the spirit and scope of the invention. Accordingly, the invention is not to be limited except as by the appended claims.

The invention claimed is:

1. A rail car supplementary brake and energy reclamation and power generating system comprising:

a motion unit, said motion unit comprising a track longitudinally arranged in the middle of a rail for rail car, a pulley block mounted on and movable along said track, and coupling means provided for a rail car moving on said rail for rail car and controlled to couple said pulley block to said rail car;

an energy accumulator unit, said energy accumulator unit comprising a spiral power spring mechanism, and a pull rope connected between said spiral power spring mechanism and said pulley block, said pull rope driving said spiral spring mechanism to wind up and to reserve elastic energy when said pulley block is pulled by said rail car along said track away from said spiral power spring mechanism, said spiral spring mechanism being released to discharge elastic energy when said pulley block receives no pull force; and a power generator unit, said power generator unit comprising a power generator, and a transmission mechanism coupling said pull rope and said spiral power spring mechanism to said power generator for driving said power generator to generate electricity both when said spiral power spring mechanism is reserving elastic energy and when said spiral power spring mechanism is releasing elastic energy.

2. The rail car supplementary brake and energy reclamation and power generating system as claimed in claim 1, wherein said spiral power spring mechanism of said energy accumulator unit comprises a spiral power spring.

3. The rail car supplementary brake and energy reclamation and power generating system as claimed in claim 1, wherein said transmission mechanism of said power generator unit comprises a first transmission gear set and a first clutch adapted to couple said pull rope to said spiral power spring mechanism for enabling said spiral power spring mechanism to reserve elastic energy upon pulling of said pull rope by said rail car and to release elastic energy and to further wind up said spiral power spring mechanism when said pull rope receives no pull force, said first clutch disconnecting said pull rope from said spiral power spring mechanism when said spiral power spring mechanism is wound up and stopped.

4. The rail car supplementary brake and energy reclamation and power generating system as claimed in claim 3, wherein said transmission mechanism of said power generator unit comprises a second transmission gear set and a second clutch adapted to couple said spiral power spring mechanism to said power generator for enabling said spiral power spring mechanism to reserve elastic energy and simultaneously drive said power generator to generate electricity upon pulling of said pull rope by said rail car, said spiral power spring mechanism being turned in the reverse direction to release elastic energy and to drive said power generator to generate electricity continuously by means of the effect of said second clutch of changing the transmission direction from said spiral power spring mechanism to said power generator when said pull rope receives no pull force.

5. The rail car supplementary brake and energy reclamation and power generating system as claimed in claim 1, wherein said coupling means is a hook; said pulley block comprises a retainer plate for the connection of said hook.

* * * * *